Aug. 22, 1939.  C. W. NESSELL  2,170,388
AIR CONDITIONING CONTROL SYSTEM
Filed June 7, 1937
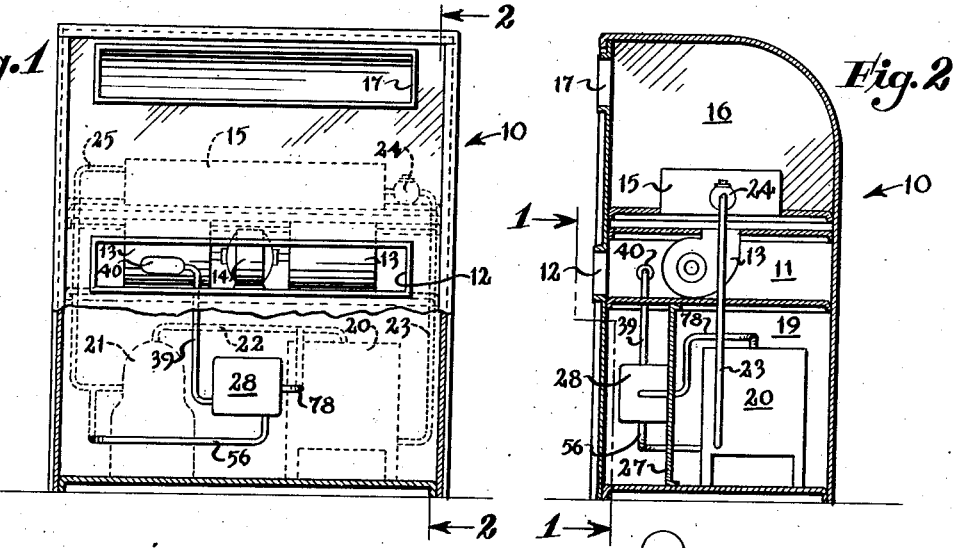
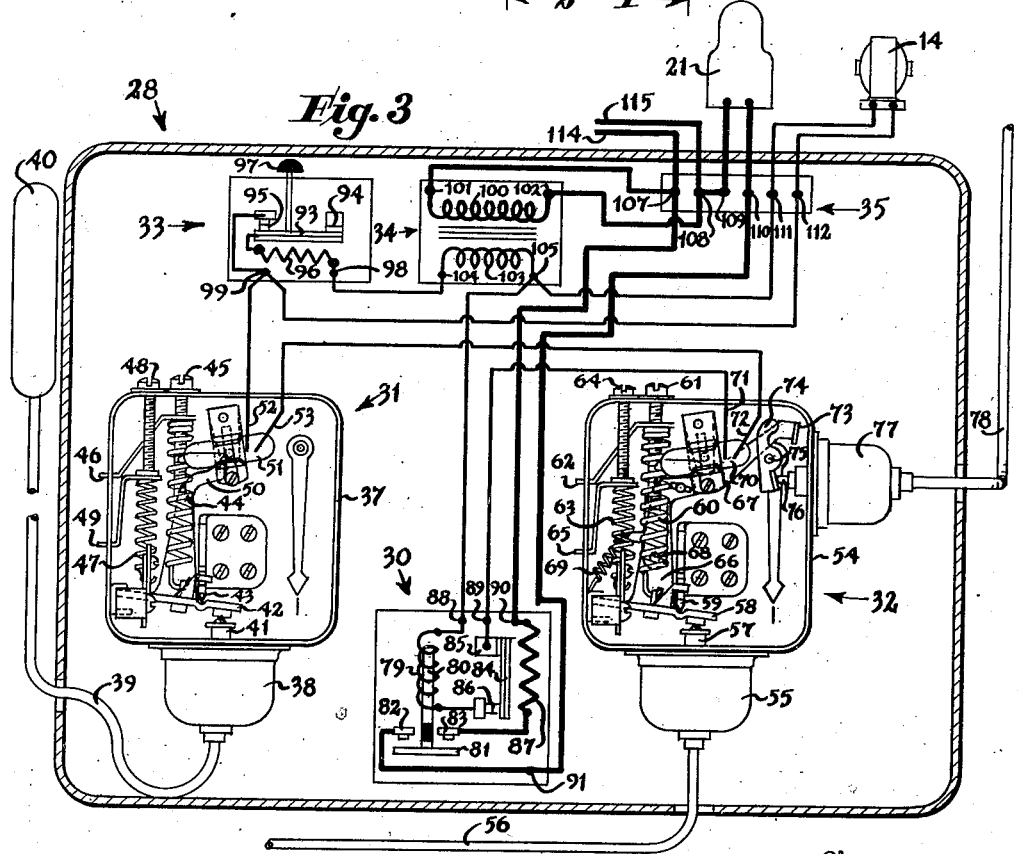
Inventor
Clarence W. Nessell
By George H Fisher
Attorney Patented Aug. 22, 1939

2,170,388

UNITED STATES PATENT OFFICE 2,170,388

AIR CONDITIONING CONTROL SYSTEM

Clarence W. Nessell, Dayton, Ohio, assignor to Minneapolis-Honeywell Regulator Company, Minneapolis, Minn., a corporation of Delaware Application June 7, 1937, Serial No. 146,756

3 Claims. (Cl. 62—4)

This invention relates to control systems in general and more particularly to control systems for air conditioning apparatus.

In the past, control systems for air conditioning apparatus have had their control instrumentalities located at various positions, such as adjacent to the conditions to which they respond, and consequently they have been widely spaced from each other and from the apparatus which they control. As a result long runs of wiring were required which necessarily increased the installation costs. Further, the installation men were not always familiar with the control systems they were installing and it was not unlikely for them to connect up these widely spaced control instrumentalities incorrectly even though specific instructions were issued to them. This invariably caused unsatisfactory operation of the air conditioning system. As is often the case, the control instrumentalities must be adjusted with respect to each other to make the control system operate properly and a great deal of time was expended by the installer or service men in moving from one central instrumentality to another. These difficulties, as well as many others, not only caused the installation and servicing costs to remain high but also increased the possibility of errors upon the part of the service or installation men.

It is therefore the prime object of this invention to provide an arrangement for obviating the above difficulties whereby installation and servicing costs are reduced to a minimum and whereby the chances of error on the part of the installation or service men is also reduced to a minimum much to the benefit of the air conditioning trade and the ultimate user.

More specifically it is an object of the invention to form a unitary control arrangement with all of the control instrumentalities located in a common housing whereby the various control instrumentalities may be assembled and connected to each other correctly at the factory of the control manufacturer. This unitary control arrangement may therefore be mounted adjacent or on the air conditioning apparatus as a unit and the connecting up of the various control instrumentalities with consequent high installation costs and relatively great chances for error are obviated.

A further object of this invention is to provide a control unit for an air conditioning apparatus having refrigerating means for cooling a space wherein the control unit comprises a housing secured to the air conditioning apparatus and including control means responsive to space temperature and control means responsive to the condition of the refrigerating apparatus for controlling the operation of the refrigerating apparatus.

Still another object of this invention is to provide a control unit for an air conditioning apparatus having air circulating means and refrigerating means for conditioning a space wherein the control unit comprises a housing secured to the air conditioning apparatus and including control means responsive to space conditions, control means responsive to the condition of the refrigerating apparatus, manual control means, and overload protection for controlling the operation of the air conditioning apparatus.

Another object of this invention is to provide a novel control arrangement for providing an improved mode of operation of an air conditioning apparatus.

Other objects and advantages will become apparent to those skilled in the art upon reference to the accompanying specification, claims and drawing.

For a more thorough understanding of this invention reference is made to the accompanying single sheet of drawing in which, Figure 1 is a front elevational view partly in section taken substantially along the line 1—1 of Figure 2 showing an air conditioning apparatus to which the control system of this invention is applied, Figure 2 is a sectional view of the air conditioning apparatus taken substantially along the line 2—2 of Figure 1, Figure 3 is a diagrammatic view of the unitary control arrangement of this invention.

Referring now to Figures 1 and 2 the air conditioning apparatus is shown for purposes of illustration to comprise a cabinet generally designated at 10. The cabinet 10 may be provided with a return air chamber 11, the return air from a space being admitted to the chamber 11 by a return air opening 12. Air circulating means in the form of fans 13 operated by a motor 14 are located in the return air chamber 11 for circulating air from the return air chamber 11 over a cooling coil 15 into a delivery chamber 16. The fans 13 force the air from the delivery chamber 16 through a discharge opening 17 in the space to be conditioned. The cooling coil 15 is shown in this instance to be an evaporator or direct expansion cooling coil.

The cabinet 10 may also be provided with a chamber 19 which encloses a mechanical refrigerating apparatus. The mechanical refrigerating apparatus may comprise a condenser 20 and an electric motor operated compressor 21. The high pressure side of the compressor 21 is connected by a pipe 22 to the condenser 20. The condenser 20 is in turn connected by a pipe 23 to an expansion valve 24 which in turn is connected to the evaporator 15. The evaporator 15 is connected by a suction pipe 25 to the low pressure side of the compressor 21. When the compressor 21 is operated, refrigerant is compressed by the compressor and discharged into the condenser 20 whereupon it is liquefied. The liquefied refrigerant flows through the expansion valve 24 into the evaporator 15 to perform a cooling function. The evaporated refrigerant is withdrawn from the evaporator 15 by the compressor 21. Such a refrigerating mechanism is old in the art and a further description is not considered necessary.

A partition 27 is located in the chamber 19 and upon this partition 27 is mounted the unitary control arrangement 28. This unitary control arrangement 28 includes all of the control instrumentalities necessary for controlling the operation of the air conditioning apparatus and therefore it may be prefabricated at the factory of the manufacturer by skilled persons thereby preventing errors in the connecting up of the instruments contained therein and also reducing installation costs. As illustrated, the unitary control arrangement 28 is mounted on the air conditioning apparatus 10 so that it is closely related therewith.

Referring now to Figure 3, the unitary control arrangement generally designated at 28 may comprise a support in the form of a housing or casing for mounting and enclosing the various control instrumentalities. These control instrumentalities are shown to comprise a starter or relay 30 for the compressor motor 21, a temperature controller 31, a pressure controller 32, a combined manual and overload cut out switch 33, a step-down transformer 34 and a terminal block 35. If desired, the starter or relay 30 may also include an overload cut out switching mechanism. The temperature responsive controller 31 is responsive to the return air temperature and may take the form of the controller illustrated in Patent No. 2,080,836 granted to S. C. Shipley on May 18, 1937. The pressure controller 32 responds to the low pressure side of the mechanical refrigerating apparatus and to the high pressure side of the mechanical refrigerating apparatus. The controller 32 is in all respects similar to the controller 31 but in addition includes the high pressure control arrangement. The terminal board 35 may be utilized to facilitate electrical connecting of the unitary controller 28, the compressor motor 21, and the fan motor 14. All of these various control instrumentalities are included in the unitary control arrangement and as pointed out above these control instrumentalities may be mounted and electrically connected together at the factory of the control manufacturer so that a purchaser may purchase a complete control system which is contained in one unitary control arrangement.

The temperature responsive controller 31 may comprise a casing 37 to which is secured a bellows assembly 38. The bellows assembly 38 is connected by a capillary tube 39 to a bulb 40 located in the return air chamber 11. The bulb 40, the tube 39 and the bellows assembly 38 preferably contain a volatile fluid so that the bellows assembly is actuated in accordance with return air temperature and hence space temperature. The bellows assembly 38 operates a plunger 41 for operating lever 42 about a pivot 43. Lever 42 is urged in one direction by a tension spring 44 which may be adjusted by a screw 45, the setting of the spring 44 being indicated by a pointer 46. A differential adjusting spring is designated at 47 and this adjusting spring may be adjusted by a screw 48, the amount of adjustment being indicated by a pointer 49. The lever 42 operates an arm 50 which in turn operates a mercury switch 51 having electrodes 52 and 53. Upon an increase in temperature in the return air chamber 11 the bellows assembly 38 expands to actuate the lever 42 against the action of the springs 44 and 47 to tilt the mercury switch 51 to cause the mercury contained therein to bridge the electrodes 52 and 53. Upon a decrease in temperature the bellows assembly 38 contracts and the springs 34 and 37 actuate the lever 42 in the opposite direction to oppositely tilt the mercury switch 51 to cause the mercury therein to disengage the electrodes 52 and 53. By suitably adjusting the tension in the spring 44 the temperature setting of the instrument may be varied at will. By suitably adjusting the spring 47, the differential of operation of the the instrument may be varied at will, all as pointed out in the above referred to Shipley patent. Therefore, upon an increase in temperature to a desired value the electrodes 52 and 53 are bridged and upon a decrease in temperature to a desired lower value, electrodes 52 and 53 are unbridged.

The pressure responsive controller 32 may comprise a casing 54 to which is secured a bellows assembly 55. The bellows assembly 55 is connected by a pipe 56 to the suction or low pressure pipe 25 of the mechanical refrigerating apparatus. The bellows assembly 55 operates a plunger 57 for rotating a lever 58 about a pivot 59. The lever 58 is urged in one direction by a spring 60 which may be adjusted by a screw 61, the amount of adjustment being indicated by the pointer 62. The lever 58 is also governed by a differential adjusting spring 63 which may be adjusted by a screw 64, the amount of adjustment being indicated by a pointer 65. The lever 58 carries an arm 66 upon which is pivotally mounted a lever 67 by a pivot 68. A strain release spring 69 holds the lever 67 in a relatively fixed position with respect to the arm 66. The lever 67 operates a mercury switch 70 containing electrodes 71 and 72. Since the strain release spring 69 maintains the arm 66 and the lever 67 relatively stationary with respect to each other, an increase in suction pressure, which causes expansion of the bellows assembly 55 causes rotation of the lever 58 against the action of the springs 60 and 63 whereupon the mercury switch 70 is tilted to cause the mercury therein to bridge the electrodes 71 and 72. Upon a decrease in suction pressure the springs 60 and 63 operate the lever 58 in the opposite direction and the mercury switch 70 is tilted to the position shown in the drawing to unbridge the electrodes 71 and 72. It is apparent therefore that the operation of the controller 32 is identical with the operation of the controller 31 and therefore a further description is not deemed necessary. It follows then that the switch 70 is closed upon a rise in suction pressure to a predetermined value and is opened upon a decrease in suction pressure to a predetermined lower value.

The lever 67 is provided with an abutment 73 which is adapted to be engaged by a lever 74 pivoted at 75. The lever 74 is operated by a plunger 76 which in turn is operated by a bellows assembly 77. The bellows assembly 77 is connected by a pipe 78 to the high pressure pipe 22 of the mechanical refrigerating apparatus. Upon a rise in pressure in the high pressure side of the mechanical refrigerating apparatus above a predetermined value the plunger 76 is moved towards the left to rotate the lever 74 in a clockwise direction. The lever 74 thereupon engages the abutment 73 to rotate the lever 67 about its pivot 68 against the action of the strain release spring 69 whereupon the mercury switch 70 is moved to an open position regardless of the value of the pressure in the suction side of the refrigerating apparatus. When the pressure in the high pressure side of the refrigerating apparatus decreases to a normal value the bellows assembly 77 contracts to move the lever 74 out of engagement with the abutment 73 whereupon the strain release spring 69 restores the position of the switch 70 to that dictated by the low pressure bellows assembly 55. From the above it is seen that the controller 32 responds to suction pressure to open or close the switch 70 depending upon the value of the suction pressure but if the high pressure should become excessive the switch 70 will be opened regardless of the value of the suction pressure.

The starter or relay generally designated at 30 may comprise an operating coil 79 for attracting an armature 80, which carries a switch arm 81. When the operating coil 79 is energized the armature 80 is attracted to move the switch arm 81 into engagement with stationary contacts 82 and 83. When the operating coil 79 is deenergized the switch arm 81 is moved out of engagement with the contacts 82 and 83 by means of springs, gravity, or other means (not shown). The overload cutout switching mechanism associated with the starter or relay may comprise a bimetallic element 84 suitably anchored at one end as at 85 for making or breaking contacts 86. The bimetallic element 84 may be heated by a heater 87. If the current flow through the heater becomes excessive bimetallic element 84 is warped to separate the contacts 86. If desired the overload cut out switching mechanism may be provided with suitable latch means, not shown, so that the contacts 86 may only be manually reclosed following the existence of an overload condition. Such a construction is old in the art and therefore not illustrated. The starter or relay 30 may be provided with terminals 88, 89, 90 and 91.

The combined manual and overload cut out switching mechanism generally designated at 33 may comprise a bimetallic element 93, one end of which is rigidly secured to a bracket 94. The other end of the bimetallic element 93 is adapted to make and break contacts 95. The bimetallic element 93 may be heated by a heater 96 and when the current flow through the heater 96 becomes excessive the bimetallic element 93 warps to separate the contacts 95. A manual operating means 97 is also provided for manually separating and making the contacts 95. Therefore the switching mechanism 33 is operated by overload conditions and is also manually operated. Suitable latch means, not shown, may be provided. The switching mechanism 33 is provided with connecting terminals 98 and 99.

Step-down transformer 34 comprises a primary 100 connected to terminals 101 and 102 and a secondary 103 connected to terminals 104 and 105. The terminal block 35 includes terminals 107, 108, 109, 110, 111, and 112 to provide means for connecting electrically the unitary control arrangement 28 to the compressor motor 21 and the fan motor 14. Line wires leading from some source of power (not shown) are designated at 114 and 115 and these wires are connected to the terminal posts 107 and 108. Since the terminal posts 107 and 108 are connected to the terminals 101 and 102 of the step-down transformer 34 the transformer 34 is at all times energized.

Assume now that the contacts 95 of the combined overload and manual switch 33 are closed, a circuit is completed from terminal 104 of the secondary 103 of the step-down transformer 34 through terminal 98, heater 96, contacts 95, terminal 99, terminal 112, fan motor 14 and terminal 111 back to terminal 105 of the secondary 103. The fan motor is thereupon placed in operation and remains in operation until such time as the contacts 95 are either manually separated or separated by an overload condition existing within the fan circuit.

Assume that the temperature responsive controller 31 is adjusted to close the switch 51 when the space temperature rises to 75° and to open the switch 51 when the space temperature decreases to 73°. Assume also that the pressure responsive controller 32 is so adjusted that the switch 70 is closed when the low pressure rises to 30 pounds and opens when the low pressure decreases to 10 pounds. For purposes of illustration it is also assumed that the high pressure will open the switch 70 when it rises to 180 pounds and will permit closing of the switch when it decreases to 160 pounds. When the space temperature rises to 75° and the suction pressure rises to 30 pounds the switches 51 and 70 which are located in series are closed to complete a circuit from the terminal 104 of the transformer 34 through terminal 98, heater 96, contacts 95, terminal 99, electrodes 52 and 53, electrodes 72 and 71, terminal 89, bimetallic element 84, contacts 86, operating coil 79 and terminal 88 back to the terminal 105 of the transformer 34. Completion of this circuit energizes the operating coil 79 of the relay 30 to cause the switch arm 81 to bridge contacts 82 and 83 which completes a circuit from the line wire 114 through terminal post 107, terminal 90, heater 87, contact 83, switch arm 81, contact 82, terminal 91, terminal post 110, compressor motor 21 and terminal posts 109 and 108 back to the other line wire 115.

The compressor motor 21 is thereupon placed in operation to cool the air delivered to the space. When the space temperature decreases to 73°, the switch 51 is opened to drop out the relay or starter 30 to stop operation of the compressor motor 21. Likewise if the suction pressure decreases to 10 pounds or the high pressure increases to 180 pounds the switch 70 is opened to drop out the relay or starter 30 to stop operation of the compressor motor 21. If an overload condition should exist within the compressor motor circuit the contacts 86 of the overload cut out switching mechanism will be separated to break the circuit through the operating coil 79 to stop operation of the compressor 21. Likewise if an overload condition should occur in the fan circuit to stop operation of the fan or if an overload condition should occur in the control circuit of the operating coil 79 the contacts 95 will separate and cause deenergization of the operating coil 79 to stop operation of the compressor 21. At this point it will be noted that the contacts 95 of the combined manual and overload cut out mechanism 33 are included in both the fan circuit and the relay or starter control circuit so that if the contacts 95 are opened manually to stop operation of the fan 14, the relay or starter 30 cannot be energized and therefore the compressor motor 21 cannot be placed in operation. In other words, the switching mechanism 33 controls both the operation of the fan 14 and the compressor 21 and therefore the compressor 21 cannot be placed in operation unless the fan 14 is operating.

The temperature responsive controller 31 operates as the primary controller to maintain the space temperature between 73° and 75° and the pressure responsive controller operates as a secondary or safety controller to prevent operation of the refrigerating apparatus in case the high pressure becomes excessive or in case the low pressure becomes too low. If either of these conditions occur the refrigerating apparatus is shut down regardless of whether the temperature responsive controller 31 is calling for cooling. If the refrigerating apparatus is shut down by the opening of the switch 70 upon a decrease in the suction pressure to 10 pounds the refrigerating apparatus cannot again be placed in operation until such time as the suction pressure rises to 30 pounds and if this 30 pound value or the cut-in point is so selected that it is above the freezing point, it will be apparent that defrosting of the cooling coil 15 will occur before the refrigerating apparatus may again be placed in operation. This periodic or intermittent defrosting of the refrigerating apparatus under these circumstances is extremely beneficial.

From the above it is seen that the control system of this invention provides a control arrangement wherein the space temperature is maintained within predetermined limits, wherein the refrigerating apparatus is safe guarded with respect to high pressures on the high pressure side and low pressures on the low pressure side, wherein overload protection for the compressor motor is provided, wherein intermittent or periodic defrosting is provided, wherein overload protection for the fan circuit is provided, and wherein the control circuit and the fan circuit may be operated by a common switching mechanism so that it is impossible to operate the refrigerating apparatus unless the air circulating means is operated. All of the control instrumentalities which perform the above relatively complex sequence of control are located in a common unitary control mechanism which may be prefabricated at the factory of the control manufacturer and may be applied to the air conditioning apparatus as a unit with consequent reduction in installation costs and reduction in the possibility of errors in hooking up the control equipment with the air conditioning apparatus. As pointed out above, this feature is of practical importance and benefits greatly the air conditioning trade as well as the ultimate user.

Although for purposes of illustration one form of this invention has been disclosed, other forms thereof may become apparent to those skilled in the art upon reference to this specification and therefore this invention is to be limited only by the scope of the appended claims and prior art.

I claim as my invention:

1. In an air conditioning system, the combination of an air conditioning apparatus including an electrically operated refrigerating apparatus for cooling air and an electrically operated air circulating means for discharging cooled air into a space, control means responsive to the temperature of the air of the space, control means responsive to pressure conditions produced in the refrigerating apparatus, switching means operated by said control means, a starter for the refrigerating apparatus including load contacts for completing a circuit to the refrigerating apparatus and an operating coil, a control circuit for the operating coil of the starter including the switching means of the control means for controlling the operation of the refrigerating apparatus, an overload cut out switching mechanism including switching means included in the control circuit and thermal means in the circuit to the refrigerating apparatus for providing overload protection, a manually operated control means including switching means, a control circuit for the electrically operated air circulating means including the switching means of the manually operated control means for controlling the operation of the air circulating means, and a common mounting structure for all of the control means, the overload cut out switching mechanism and the starter whereby the control of the air conditioning apparatus is centralized at one point.

2. In an air conditioning system, the combination of an air conditioning apparatus including an electrically operated refrigerating apparatus for cooling air and an electrically operated air circulating means for discharging cooled air into a space, control means responsive to the temperature of the air in the space, control means responsive to pressure conditions produced in the refrigerating apparatus, switching means operated by said control means, a starter for the refrigerating apparatus including load contacts for completing a circuit to the refrigerating apparatus and an operating coil, a control circuit for the operating coil of the starter including the switching means for controlling the operation of the starter and hence of the refrigerating apparatus, an overload cut-out switching mechanism including switching means in the control circuit and thermal means in the circuit to the refrigerating apparatus for providing overload protection, manually operated switching means, a control circuit for the electrically operated air circulating means including the manually operated switching means for controlling the operation of the air circulating means, said manually operated switching means being also included in said control circuit for the operating coil of the starter whereby the manually operated switching means controls the operation of both the refrigerating apparatus and the air circulating means.

3. In an air conditioning system, the combination of an air conditioning apparatus including an electrically operated refrigerating apparatus for cooling air and an electrically operated air circulating means for discharging cooled air into a space, control means responsive to the temperature of the air in the space, control means responsive to pressure conditions produced in the refrigerating apparatus, switching means operated by said control means, a starter for the refrigerating apparatus including load contacts for completing a circuit to the refrigerating apparatus and an operating coil, a control circuit for the operating coil of the starter including the switching means for controlling the operation of the starter and hence of the refrigerating apparatus, an overload cut-out switching mechanism including switching means in the control circuit and thermal means in the circuit to the refrigerating apparatus for providing overload protection, a control circuit for the electrically operated air circulating means, and a combined overload cut-out and manual switching mechanism including thermal means and switching means in the control circuit for the electrically operated air circulating means for controlling the operation of the air circulating means, the switching means of the combined overload cut-out and manual switching mechanism being also included in said control circuit for the operating coil of the starter whereby the combined overload cut-out and manual switching mechanism controls the operation of both the refrigerating apparatus and the air circulating means.

CLARENCE W. NESSELL.